(12) United States Patent
Richards

(10) Patent No.: US 11,608,839 B2
(45) Date of Patent: Mar. 21, 2023

(54) BRACKET MOUNT FOR ENGINE WITH PUMP PACKAGE

(71) Applicant: Clark Equipment Company, West Fargo, ND (US)

(72) Inventor: John D. Richards, Lisbon, ND (US)

(73) Assignee: CLARK EQUIPMENT COMPANY, West Fargo, ND (US)

(*) Notice: Subject to any disclaimer, the term of this patent is extended or adjusted under 35 U.S.C. 154(b) by 498 days.

(21) Appl. No.: 16/697,424

(22) Filed: Nov. 27, 2019

(65) Prior Publication Data

US 2020/0166057 A1 May 28, 2020

Related U.S. Application Data

(60) Provisional application No. 62/771,732, filed on Nov. 27, 2018.

(51) Int. Cl.
*B60K 17/10* (2006.01)
*F15B 7/00* (2006.01)
*B60K 17/26* (2006.01)

(52) U.S. Cl.
CPC .............. *F15B 7/006* (2013.01); *B60K 17/10* (2013.01); *B60K 17/26* (2013.01); *F15B 2211/20523* (2013.01)

(58) Field of Classification Search
CPC ................................ B60K 17/10; B60K 17/26
See application file for complete search history.

(56) References Cited

U.S. PATENT DOCUMENTS

| 1,902,509 | A | 3/1933 | Lee |
| 3,527,549 | A | 9/1970 | Seward et al. |
| 4,403,762 | A | 9/1983 | Cogswell, II et al. |
| 4,509,475 | A | 4/1985 | Visek |
| 4,955,455 | A | 9/1990 | Albright et al. |
| 4,962,825 | A | 10/1990 | Albright et al. |
| 5,310,017 | A | 5/1994 | Tobias |
| 5,701,969 | A | 12/1997 | Stephens |
| 6,065,559 | A | 5/2000 | Cholewczynski et al. |
| 6,085,859 | A | 7/2000 | Alderson |
| 6,138,786 | A | 10/2000 | Anderson et al. |

(Continued)

FOREIGN PATENT DOCUMENTS

CN 201695424 U * 1/2011
EP 1302355 A2 * 4/2003 ............. B60K 17/06

(Continued)

OTHER PUBLICATIONS

International Search Report and Written Opinion dated Feb. 25, 2020 for International Application No. PCT/2019/063520 filed Nov. 27, 2019, 11 pages.

(Continued)

*Primary Examiner* — Katy M Ebner
(74) *Attorney, Agent, or Firm* — John Veldhuis-Kroeze; Westman, Champlin & Koehler, P.A.

(57) ABSTRACT

A power machine with an internal combustion engine and an in-line hydrostatic/hydraulic pump package includes a stiffening bracket which mounts a flywheel housing to the engine and is configured to change the natural frequency of the engine/pump package so that the engine firing frequency does not match the natural frequency of the engine/pump package.

21 Claims, 5 Drawing Sheets

(56) References Cited

U.S. PATENT DOCUMENTS

| | | | |
|---|---|---|---|
| 6,205,665 B1 * | 3/2001 | Anderson | B62D 21/186 |
| | | | 296/203.02 |
| 6,742,619 B2 | 6/2004 | Farbotnik et al. | |
| 7,789,189 B2 * | 9/2010 | Bigg | B60K 17/00 |
| | | | 180/312 |
| 8,038,379 B2 | 10/2011 | Yamashita et al. | |
| 8,469,136 B2 * | 6/2013 | Manabe | E02F 9/0866 |
| | | | 180/312 |
| 8,985,260 B2 | 3/2015 | Holoweiko et al. | |
| 8,985,261 B2 | 3/2015 | Driant et al. | |
| 9,505,301 B2 | 11/2016 | Sandou | |
| 2003/0150663 A1 | 8/2003 | Farbotnik et al. | |
| 2008/0072997 A1 * | 3/2008 | Thompson | A01G 23/093 |
| | | | 144/34.1 |
| 2012/0260891 A1 * | 10/2012 | Love | F02M 63/0001 |
| | | | 123/495 |
| 2013/0220720 A1 * | 8/2013 | Iizuka | E02F 9/0833 |
| | | | 180/65.26 |
| 2016/0289921 A1 | 10/2016 | Liu et al. | |
| 2017/0362796 A1 * | 12/2017 | Nakagawa | F01N 3/021 |
| 2019/0284993 A1 * | 9/2019 | Akei | F01N 3/28 |
| 2020/0166057 A1 * | 5/2020 | Richards | E02F 9/0866 |

FOREIGN PATENT DOCUMENTS

| | | | |
|---|---|---|---|
| JP | 2000190742 A | * | 7/2000 |
| JP | 2003154856 A | * | 5/2003 |
| JP | 4195917 B2 | * | 12/2008 |
| JP | 2013076266 A | * | 4/2013 |
| JP | 2015031341 A | * | 2/2015 |
| JP | 2018091228 A | | 6/2018 |
| JP | 2019049112 A | * | 3/2019 |

OTHER PUBLICATIONS

Communication pursuant to Article 94(3) EPC dated Sep. 6, 2022, for corresponding European Application No. 19 824 112.7, 3 pages.

* cited by examiner

BRACKET MOUNT FOR ENGINE WITH PUMP PACKAGE

CROSS-REFERENCE TO RELATED APPLICATION

This application claims the benefit of U.S. Provisional Application No. 62/771,732, which was filed on Nov. 27, 2018.

BACKGROUND

This disclosure is directed toward power machines. More particularly, this disclosure is directed to power machines having an internal combustion engine with an in-line hydrostatic/hydraulic pump package. Power machines, for the purposes of this disclosure, include any type of machine that generates power for accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Work vehicles include loaders, excavators, utility vehicles, tractors, and trenchers, to name a few examples.

Power machines, such as loaders, frequently utilize internal combustion engines and a coupled hydrostatic/hydraulic pump package. When an internal combustion engine is connected in-line with a hydrostatic/hydraulic pump package or other power conversion systems for converting an output power signal of an engine to a signal that can perform work of various types, the excitation frequency from the combustion firing of the engine can match the natural frequency of the engine/pump system. If the engine firing frequency matches the natural frequency of the engine/power conversion system, the engine/pump will be excited and will go into resonance which can ultimately damage or destroy the engine/pump system. In addition, other sources of vibration besides the firing frequency can impact the power conversion system coupled to the engine.

The discussion above is merely provided for general background information and is not intended to be used as an aid in determining the scope of the claimed subject matter.

SUMMARY

Disclosed embodiments include power machines, and internal combustion engines for power machines, with a power conversion system such as a hydrostatic/hydraulic pump package mounted in-line to the engine. A stiffening bracket is mounted to a flywheel housing and to the engine and is configured to change the natural frequency of the engine/pump package so that the engine firing frequency or other vibration source does not match the natural frequency of the engine/pump package.

One general aspect includes a power machine (100; 200), including: a frame (110; 210); a power system (120; 220) supported by the frame, the power system including: a power source (222) including an engine (322) and a flywheel housing (330) mounted to the engine with a flywheel positioned within the flywheel housing and driven by an output of the engine; a power conversion system (224) including a hydraulic pump package (324) that is mounted to the flywheel housing and is arranged in-line with and operatively coupled to the engine and a drive motor in hydraulic communication with the hydraulic pump package; and a stiffening bracket (340) fastened to the flywheel housing and to the engine and configured to alter a natural frequency of the combined engine and hydraulic pump a power conversion system (224) including a hydraulic pump package (324) that is mounted to the flywheel housing and is arranged in-line with and operatively coupled to the engine and a drive motor in hydraulic communication with the hydraulic pump package. The power machine also includes a traction system (240) having a tractive element operatively coupled to the drive motor and configured to be driven by the drive motor to control movement of the power machine.

Implementations may include one or more of the following features. The power machine where the engine (322) is an internal combustion engine, and where the stiffening bracket (340) is configured to alter the natural frequency of the combined engine and in-line hydraulic pump package system relative to a firing frequency of the internal combustion engine. The power machine where the stiffening bracket (340) is configured to increase the natural frequency of the combined engine and in-line pump package system. The power machine where the hydraulic pump package is bolted to the flywheel housing (330) with fasteners (332). The power machine where the stiffening bracket (340) includes first and second vertical support plates (342) each secured to one of first and second opposing sides (352) of the engine (322). The power machine where the first and second vertical support plates (342) are each secured to bottom portions of the ones of the first and second opposing sides (352) of the engine. The power machine where the stiffening bracket (340) further includes a cross-member (346) secured to each of the first and second vertical support plates (342), and where the flywheel housing (330) is mounted to the engine (322) through the cross-member (346). The power machine where the cross-member (346) is positioned along a side (354) of the engine extending between the first and second opposing sides (352).

One general aspect includes a power system (120; 220) for a power machine, the power system including: a power source (222) including an engine (322) and a flywheel; a power conversion system (224) including a hydraulic pump package (324) mounted to a flywheel housing (330) of the flywheel and coupled in-line with the engine; a bracket (340) mounted to the flywheel housing to the engine and configured to alter a natural frequency of a combined engine and hydraulic pump package system relative to a frequency of the engine.

Implementations may include one or more of the following features. The power system where the engine (322) is an internal combustion engine, and where the bracket (340) is configured to mount the flywheel housing (330) to the engine. The power system where the bracket (340) is a stiffening bracket configured to alter the natural frequency of the combined engine and in-line hydraulic pump package system relative to a firing frequency of the internal combustion engine. The power system where the bracket (340) is configured to increase the natural frequency of the combined engine and in-line hydraulic pump package system. The power system where the in-line hydraulic pump package (324) is bolted to the flywheel housing (330) with first fasteners (332). The power system where the flywheel housing (330) is bolted to the engine (322) through the bracket (340). The power system where the bracket (340) includes first and second vertical support plates (342) each secured to one of first and second opposing sides (352) of the engine (322). The power system where the first and second vertical support plates (342) are each secured to bottom portions of the ones of the first and second opposing sides (352) of the engine. The power system where the bracket (340) further includes a cross-member (346) secured to each of the first and second vertical support plates (342), and where the flywheel housing (330) is mounted to the engine (322) through the cross-member (346). The power system where the cross-member (346) extends along a side (354) of the engine extending between the first and second opposing sides (352), and where the second fasteners (334) extend through the cross-member.

One general aspect includes a power machine, having a frame (110; 210); and a power system (120; 220) supported by the frame, the power system including: a power source (222) including an engine (322); a power conversion system (224) including a hydraulic pump package (324) that is operatively coupled to the engine; and a stiffening bracket (340) fastened to the engine and configured to alter a natural frequency of the combined engine and hydraulic pump.

This Summary and the Abstract are provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

DETAILED DESCRIPTION

The concepts disclosed in this discussion are described and illustrated with reference to exemplary embodiments. These concepts, however, are not limited in their application to the details of construction and the arrangement of components in the illustrative embodiments and are capable of being practiced or being carried out in various other ways. The terminology in this document is used for description and should not be regarded as limiting. Words such as "including," "comprising," and "having" and variations thereof as used herein are meant to encompass the items listed thereafter, equivalents thereof, as well as additional items.

Disclosed embodiments include power machines, and internal combustion engines for power machines, with a hydrostatic/hydraulic pump package mounted in-line to the engine and a stiffening bracket configured and arranged to change the natural frequency of the engine/pump package so that the engine firing frequency or other vibration source does not match the natural frequency of the engine/pump package. In exemplary embodiments, the pump package is mounted on a flywheel housing. The flywheel housing is bolted or otherwise mounted on a stiffening bracket mechanism, and the stiffening bracket mechanism is bolted or otherwise mounted to the engine.

Figure 2:
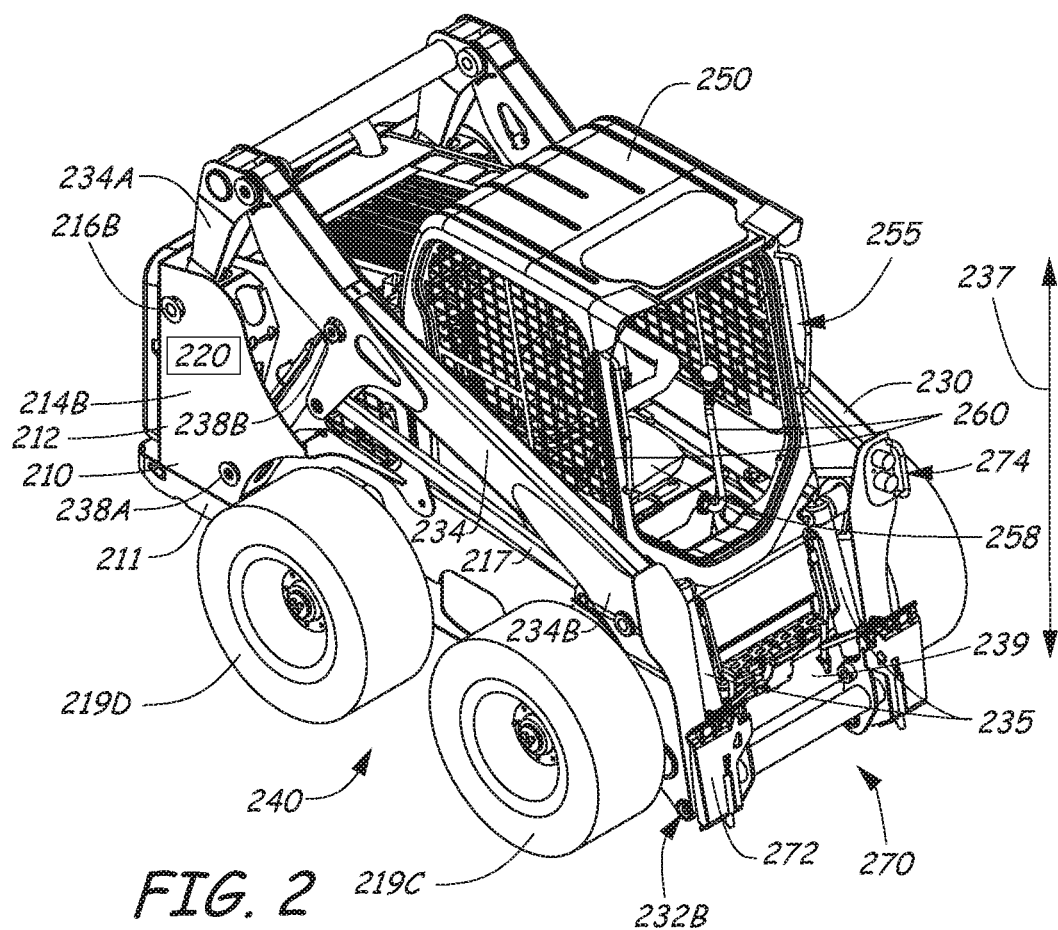
FIGS. 2-3 illustrate perspective views of a representative power machine in the form of a skid-steer loader of the type on which the disclosed embodiments can be practiced.
Figure 3:
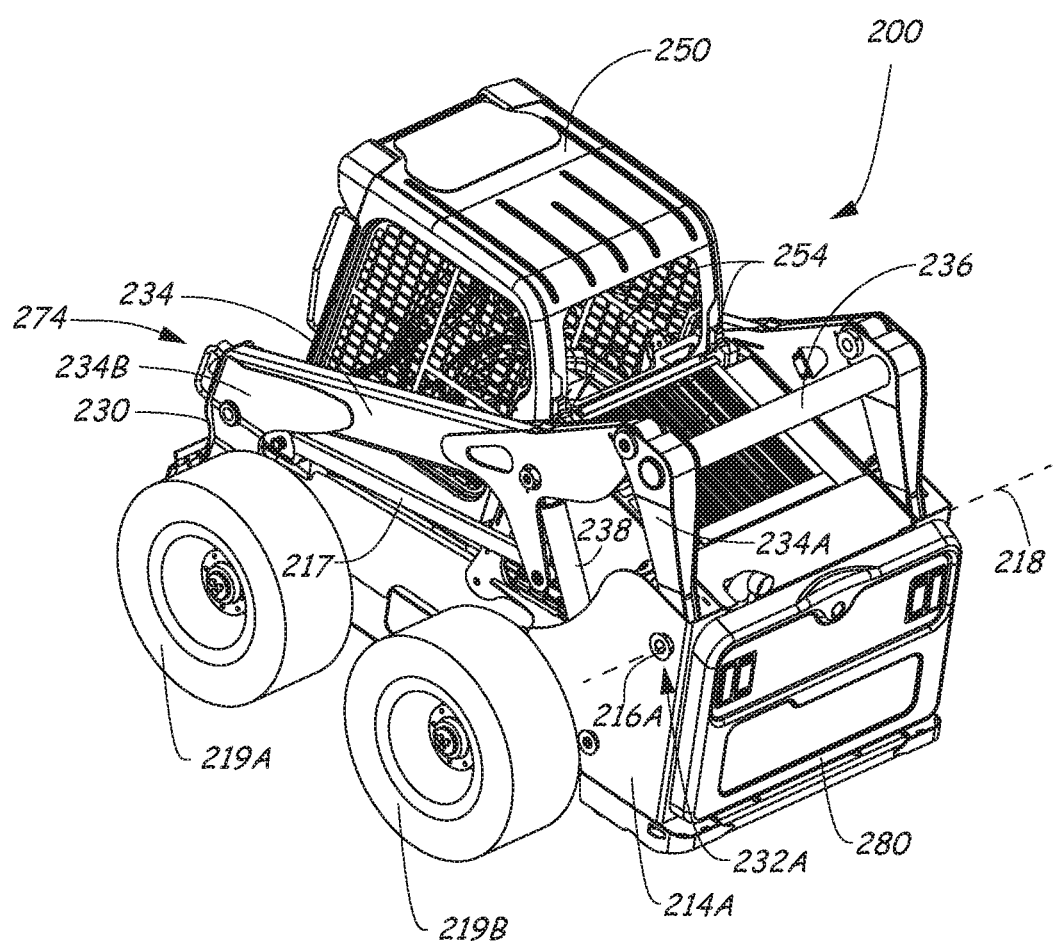

These concepts can be practiced on various power machines, as will be described below. A representative power machine on which the embodiments can be practiced is illustrated in diagram form in FIG. 1 and one example of such a power machine is illustrated in FIGS. 2-3 and described below before any embodiments are disclosed. For the sake of brevity, only one power machine is illustrated and discussed as being a representative power machine. However, as mentioned above, the embodiments below can be practiced on any of several power machines, including power machines of different types from the representative power machine shown in FIGS. 2-3. Power machines, for the purposes of this discussion, include a frame, at least one work element, and a power source that can provide power to the work element to accomplish a work task. One type of power machine is a self-propelled work vehicle. Self-propelled work vehicles are a class of power machines that include a frame, work element, and a power source that can provide power to the work element. At least one of the work elements is a motive system for moving the power machine under power.

Figure 1:
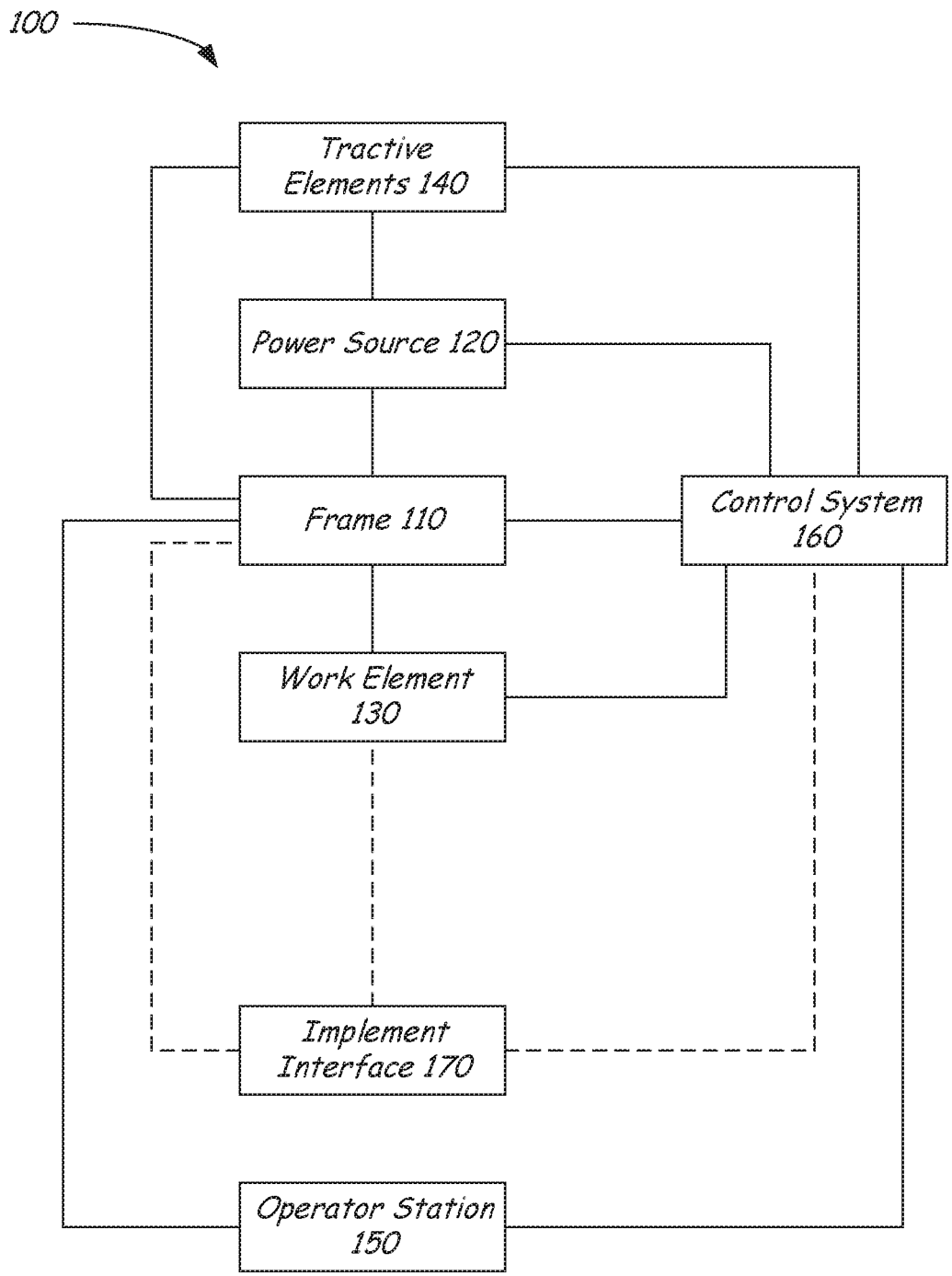
FIG. 1 is a block diagram illustrating functional systems of a representative power machine on which embodiments of the present disclosure can be advantageously practiced.

FIG. 1 is a block diagram that illustrates the basic systems of a power machine 100, which can be any of a number of different types of power machines, upon which the embodiments discussed below can be advantageously incorporated. The block diagram of FIG. 1 identifies various systems on power machine 100 and the relationship between various components and systems. As mentioned above, at the most basic level, power machines for the purposes of this discussion include a frame, a power source, and a work element. The power machine 100 has a frame 110, a power source 120, and a work element 130. Because power machine 100 shown in FIG. 1 is a self-propelled work vehicle, it also has tractive elements 140, which are themselves work elements provided to move the power machine over a support surface and an operator station 150 that provides an operating position for controlling the work elements of the power machine. A control system 160 is provided to interact with the other systems to perform various work tasks at least in part in response to control signals provided by an operator.

Certain work vehicles have work elements that can perform a dedicated task. For example, some work vehicles have a lift arm to which an implement such as a bucket is attached such as by a pinning arrangement. The work element, i.e., the lift arm can be manipulated to position the implement for performing the task. The implement, in some instances can be positioned relative to the work element, such as by rotating a bucket relative to a lift arm, to further position the implement. Under normal operation of such a work vehicle, the bucket is intended to be attached and under use. Such work vehicles may be able to accept other implements by disassembling the implement/work element combination and reassembling another implement in place of the original bucket. Other work vehicles, however, are intended to be used with a wide variety of implements and have an implement interface such as implement interface 170 shown in FIG. 1. At its most basic, implement interface 170 is a connection mechanism between the frame 110 or a work element 130 and an implement, which can be as simple as a connection point for attaching an implement directly to the frame 110 or a work element 130 or more complex, as discussed below.

On some power machines, implement interface 170 can include an implement carrier, which is a physical structure movably attached to a work element. The implement carrier has engagement features and locking features to accept and secure any of a number of implements to the work element.

One characteristic of such an implement carrier is that once an implement is attached to it, it is fixed to the implement (i.e. not movable with respect to the implement) and when the implement carrier is moved with respect to the work element, the implement moves with the implement carrier. The term implement carrier as used herein is not merely a pivotal connection point, but rather a dedicated device specifically intended to accept and be secured to various different implements. The implement carrier itself is mountable to a work element 130 such as a lift arm or the frame 110. Implement interface 170 can also include one or more power sources for providing power to one or more work elements on an implement. Some power machines can have a plurality of work element with implement interfaces, each of which may, but need not, have an implement carrier for receiving implements. Some other power machines can have a work element with a plurality of implement interfaces so that a single work element can accept a plurality of implements simultaneously. Each of these implement interfaces can, but need not, have an implement carrier.

Frame 110 includes a physical structure that can support various other components that are attached thereto or positioned thereon. The frame 110 can include any number of individual components. Some power machines have frames that are rigid. That is, no part of the frame is movable with respect to another part of the frame. Other power machines have at least one portion that can move with respect to another portion of the frame. For example, excavators can have an upper frame portion that rotates with respect to a lower frame portion. Other work vehicles have articulated frames such that one portion of the frame pivots with respect to another portion for accomplishing steering functions.

Frame 110 supports the power source 120, which is configured to provide power to one or more work elements 130 including the one or more tractive elements 140, as well as, in some instances, providing power for use by an attached implement via implement interface 170. Power from the power source 120 can be provided directly to any of the work elements 130, tractive elements 140, and implement interfaces 170. Alternatively, power from the power source 120 can be provided to a control system 160, which in turn selectively provides power to the elements that can use it to perform a work function. Power sources for power machines typically include an engine such as an internal combustion engine and a power conversion system such as a mechanical transmission or a hydraulic system that is configured to convert the output from an engine into a form of power that is usable by a work element. Other types of power sources can be incorporated into power machines, including electrical sources or a combination of power sources, known generally as hybrid power sources. Exemplary embodiments include an internal combustion engine with an in-line hydrostatic or hydraulic pump package. An example of such an engine/pump package combination is discussed with reference to FIG. 5. Although not shown in any of the figures, in other embodiments, other power conversion systems can be coupled to the engine. Some examples of power conversion systems that can be coupled to the engine include mechanical transmissions (as opposed to hydrostatic or hydraulic), compressors, and generators, to name a few.

FIG. 1 shows a single work element designated as work element 130, but various power machines can have any number of work elements. Work elements are typically attached to the frame of the power machine and movable with respect to the frame when performing a work task. In addition, tractive elements 140 are a special case of work element in that their work function is generally to move the power machine 100 over a support surface. Tractive elements 140 are shown separate from the work element 130 because many power machines have additional work elements besides tractive elements, although that is not always the case. Power machines can have any number of tractive elements, some or all of which can receive power from the power source 120 to propel the power machine 100. Tractive elements can be, for example, track assemblies, wheels attached to an axle, and the like. Tractive elements can be mounted to the frame such that movement of the tractive element is limited to rotation about an axle (so that steering is accomplished by a skidding action) or, alternatively, pivotally mounted to the frame to accomplish steering by pivoting the tractive element with respect to the frame.

Power machine 100 includes an operator station 150 that includes an operating position from which an operator can control operation of the power machine. In some power machines, the operator station 150 is defined by an enclosed or partially enclosed cab. Some power machines on which the disclosed embodiments may be practiced may not have a cab or an operator compartment of the type described above. For example, a walk behind loader may not have a cab or an operator compartment, but rather an operating position that serves as an operator station from which the power machine is properly operated. More broadly, power machines other than work vehicles may have operator stations that are not necessarily similar to the operating positions and operator compartments referenced above. Further, some power machines such as power machine 100 and others, whether or not they have operator compartments or operator positions, may be capable of being operated remotely (i.e. from a remotely located operator station) instead of or in addition to an operator station adjacent or on the power machine. This can include applications where at least some of the operator-controlled functions of the power machine can be operated from an operating position associated with an implement that is coupled to the power machine. Alternatively, with some power machines, a remote-control device can be provided (i.e. remote from both of the power machine and any implement to which is it coupled) that is capable of controlling at least some of the operator-controlled functions on the power machine.

FIGS. 2-3 illustrate a loader 200, which is one particular example of a power machine of the type illustrated in FIG. 1 where the embodiments discussed below can be advantageously employed. Loader 200 is a skid-steer loader, which is a loader that has tractive elements (in this case, four wheels) that are mounted to the frame of the loader via rigid axles. Here the phrase "rigid axles" refers to the fact that the skid-steer loader 200 does not have any tractive elements that can be rotated or steered to help the loader accomplish a turn. Instead, a skid-steer loader has a drive system that independently powers one or more tractive elements on each side of the loader so that by providing differing tractive signals to each side, the machine will tend to skid over a support surface. These varying signals can even include powering tractive element(s) on one side of the loader to move the loader in a forward direction and powering tractive element(s) on another side of the loader to move the loader in a reverse direction so that the loader will turn about a radius centered within the footprint of the loader itself. The term "skid-steer" has traditionally referred to loaders that have skid steering as described above with wheels as tractive elements. However, it should be noted that many track loaders also accomplish turns via skidding and are technically skid-steer loaders, even though they do not have wheels. For the purposes of this discussion, unless noted otherwise, the term skid-steer should not be seen as limiting the scope of the discussion to those loaders with wheels as tractive elements.

Loader 200 is one particular example of the power machine 100 illustrated broadly in FIG. 1 and discussed above. To that end, features of loader 200 described below include reference numbers that are generally similar to those used in FIG. 1. For example, loader 200 is described as having a frame 210, just as power machine 100 has a frame 110. Skid-steer loader 200 is described herein to provide a reference for understanding one environment on which the embodiments described below related to track assemblies and mounting elements for mounting the track assemblies to a power machine may be practiced. The loader 200 should not be considered limiting especially as to the description of features that loader 200 may have described herein that are not essential to the disclosed embodiments and thus may or may not be included in power machines other than loader 200 upon which the embodiments disclosed below may be advantageously practiced. Unless specifically noted otherwise, embodiments disclosed below can be practiced on a variety of power machines, with the loader 200 being only one of those power machines. For example, some or all of the concepts discussed below can be practiced on many other types of work vehicles such as various other loaders, excavators, trenchers, utility vehicles, and dozers, to name but a few examples. Some of these various other vehicles may not be skid-steer vehicles, but may employ other types of steering.

Loader 200 includes frame 210 that supports a power system 220, the power system can generate or otherwise providing power for operating various functions on the power machine. Power system 220 is shown in block diagram form but is located within the frame 210. Frame 210 also supports a work element in the form of a lift arm assembly 230 that is powered by the power system 220 and can perform various work tasks. As loader 200 is a work vehicle, frame 210 also supports a traction system 240, which is also powered by power system 220 and can propel the power machine over a support surface. The lift arm assembly 230 in turn supports an implement interface 270, which includes an implement carrier 272 that can receive and securing various implements to the loader 200 for performing various work tasks and power couplers 274, to which an implement can be coupled for selectively providing power to an implement that might be connected to the loader. Power couplers 274 can provide sources of hydraulic or electric power or both. The loader 200 includes a cab 250 that defines an operator station 255 from which an operator can manipulate various control devices 260 to cause the power machine to perform various work functions. Cab 250 can be pivoted back about an axis that extends through mounts 254 to provide access to power system components as needed for maintenance and repair.

The operator station 255 includes an operator seat 258 and a plurality of operation input devices, including control levers 260 that an operator can manipulate to control various machine functions. Operator input devices can include buttons, switches, levers, sliders, pedals, and the like that can be stand-alone devices such as hand operated levers or foot pedals or incorporated into hand grips or display panels, including programmable input devices. Actuation of operator input devices can generate signals in the form of electrical signals, hydraulic signals, and/or mechanical signals. Signals generated in response to operator input devices are provided to various components on the power machine for controlling various functions on the power machine. Among the functions that are controlled via operator input devices on power machine 100 include control of the tractive elements 219, the lift arm assembly 230, the implement carrier 272, and providing signals to any implement that may be operably coupled to the implement.

Loaders can include human-machine interfaces including display devices that are provided in the cab 250 to give indications of information relatable to the operation of the power machines in a form that can be sensed by an operator, such as, for example audible and/or visual indications. Audible indications can be made in the form of buzzers, bells, and the like or via verbal communication. Visual indications can be made in the form of graphs, lights, icons, gauges, alphanumeric characters, and the like. Displays can provide dedicated indications, such as warning lights or gauges, or dynamic to provide programmable information, including programmable display devices such as monitors of various sizes and capabilities. Display devices can provide diagnostic information, troubleshooting information, instructional information, and various other types of information that assists an operator with operation of the power machine or an implement coupled to the power machine. Other information that may be useful for an operator can also be provided. Other power machines, such as walk behind loaders may not have a cab nor an operator compartment, nor a seat. The operator position on such loaders is generally defined relative to a position where an operator is best suited to manipulate operator input devices.

Various power machines that can include and/or interacting with the embodiments discussed below can have various different frame components that support various work elements. The elements of frame 210 discussed herein are provided for illustrative purposes. Other power machines on which the embodiments can be practiced can have different types of frames. Frame 210 of loader 200 includes an undercarriage or lower portion 211 of the frame and a mainframe or upper portion 212 of the frame that is supported by the undercarriage. The mainframe 212 of loader 200, in some embodiments is attached to the undercarriage 211 such as with fasteners or by welding the undercarriage to the mainframe. Alternatively, the mainframe and undercarriage can be integrally formed. Mainframe 212 includes a pair of upright portions 214A and 214B located on either side and toward the rear of the mainframe that support lift arm assembly 230 and to which the lift arm assembly 230 is pivotally attached. The lift arm assembly 230 is illustratively pinned to each of the upright portions 214A and 214B. The combination of mounting features on the upright portions 214A and 214B and the lift arm assembly 230 and mounting hardware (including pins used to pin the lift arm assembly to the mainframe 212) are collectively referred to as joints 216A and 216B (one is located on each of the upright portions 214) for the purposes of this discussion. Joints 216A and 216B are aligned along an axis 218 so that the lift arm assembly is capable of pivoting, as discussed below, with respect to the frame 210 about axis 218. Other power machines may not include upright portions on either side of the frame, or may not have a lift arm assembly that is mountable to upright portions on either side and toward the rear of the frame. For example, some power machines may have a single arm, mounted to a single side of the power machine or to a front or rear end of the power machine. Other machines can have a plurality of work elements, including a plurality of lift arms, each of which is mounted to the machine in its own configuration. Frame 210 also supports a pair of tractive elements in the form of wheels 219A-D on either side of the loader 200.

The lift arm assembly 230 shown in FIGS. 2-3 is one example of many different types of lift arm assemblies that can be attached to a power machine such as loader 200 or other power machines on which embodiments of the present discussion can be practiced. The lift arm assembly 230 is what is known as a vertical lift arm, meaning that the lift arm assembly 230 is moveable (i.e. the lift arm assembly can be raised and lowered) under control of the loader 200 with respect to the frame 210 along a lift path 237 that forms a generally vertical path. Other lift arm assemblies can have different geometries and can be coupled to the frame of a loader in various ways to provide lift paths that differ from the radial path of lift arm assembly 230. For example, some lift paths on other loaders provide a radial lift path. Other lift arm assemblies can have an extendable or telescoping portion. Other power machines can have a plurality of lift arm assemblies attached to their frames, with each lift arm assembly being independent of the other(s). Unless specifically stated otherwise, none of the inventive concepts set forth in this discussion are limited by the type or number of lift arm assemblies that are coupled to a particular power machine.

The lift arm assembly 230 has a pair of lift arms 234 that are disposed on opposing sides of the frame 210. A first end of each of the lift arms 234 is pivotally coupled to the power machine at joints 216 and a second end 232B of each of the lift arms is positioned forward of the frame 210 when in a lowered position as shown in FIG. 2. Joints 216 are located toward a rear of the loader 200 so that the lift arms extend along the sides of the frame 210. The lift path 237 is defined by the path of travel of the second end 232B of the lift arms 234 as the lift arm assembly 230 is moved between a minimum and maximum height.

Each of the lift arms 234 has a first portion 234A of each lift arm 234 is pivotally coupled to the frame 210 at one of the joints 216 and the second portion 234B extends from its connection to the first portion 234A to the second end 232B of the lift arm assembly 230. The lift arms 234 are each coupled to a cross member 236 that is attached to the first portions 234A. Cross member 236 provides increased structural stability to the lift arm assembly 230. A pair of actuators 238, which on loader 200 are hydraulic cylinders configured to receive pressurized fluid from power system 220, are pivotally coupled to both the frame 210 and the lift arms 234 at pivotable joints 238A and 238B, respectively, on either side of the loader 200. The actuators 238 are sometimes referred to individually and collectively as lift cylinders. Actuation (i.e., extension and retraction) of the actuators 238 cause the lift arm assembly 230 to pivot about joints 216 and thereby be raised and lowered along a fixed path illustrated by arrow 237. Each of a pair of control links 217 are pivotally mounted to the frame 210 and one of the lift arms 234 on either side of the frame 210. The control links 217 help to define the fixed lift path of the lift arm assembly 230.

Some lift arms, most notably lift arms on excavators but also possible on loaders, may have portions that are controllable to pivot with respect to another segment instead of moving in concert (i.e. along a pre-determined path) as is the case in the lift arm assembly 230 shown in FIG. 2. Some power machines have lift arm assemblies with a single lift arm, such as is known in excavators or even some loaders and other power machines. Other power machines can have a plurality of lift arm assemblies, each being independent of the other(s).

An implement interface 270 is provided proximal to a second end 232B of the lift arm assembly 230. The implement interface 270 includes an implement carrier 272 that is capable of accepting and securing a variety of different implements to the lift arm assembly 230. Such implements have a complementary machine interface that is configured to be engaged with the implement carrier 272. The implement carrier 272 is pivotally mounted at the second end 232B of the arm assembly 230. Implement carrier actuators 235 are operably coupled to the lift arm assembly 230 and the implement carrier 272 and are operable to rotate the implement carrier with respect to the lift arm assembly. Implement carrier actuators 235 are illustratively hydraulic cylinders and often known as tilt cylinders.

By having an implement carrier capable of being attached to a plurality of different implements, changing from one implement to another can be accomplished with relative ease. For example, machines with implement carriers can provide an actuator between the implement carrier and the lift arm assembly, so that removing or attaching an implement does not involve removing or attaching an actuator from the implement or removing or attaching the implement from the lift arm assembly. The implement carrier 272 provides a mounting structure for easily attaching an implement to the lift arm (or other portion of a power machine) that a lift arm assembly without an implement carrier does not have.

Some power machines can have implements or implement like devices attached to it such as by being pinned to a lift arm with a tilt actuator also coupled directly to the implement or implement type structure. A common example of such an implement that is rotatably pinned to a lift arm is a bucket, with one or more tilt cylinders being attached to a bracket that is fixed directly onto the bucket such as by welding or with fasteners. Such a power machine does not have an implement carrier, but rather has a direct connection between a lift arm and an implement.

The implement interface 270 also includes an implement power source 274 available for connection to an implement on the lift arm assembly 230. The implement power source 274 includes pressurized hydraulic fluid port to which an implement can be removably coupled. The pressurized hydraulic fluid port selectively provides pressurized hydraulic fluid for powering one or more functions or actuators on an implement. The implement power source can also include an electrical power source for powering electrical actuators and/or an electronic controller on an implement. The implement power source 274 also exemplarily includes electrical conduits that are in communication with a data bus on the excavator 200 to allow communication between a controller on an implement and electronic devices on the loader 200.

Figure 4:
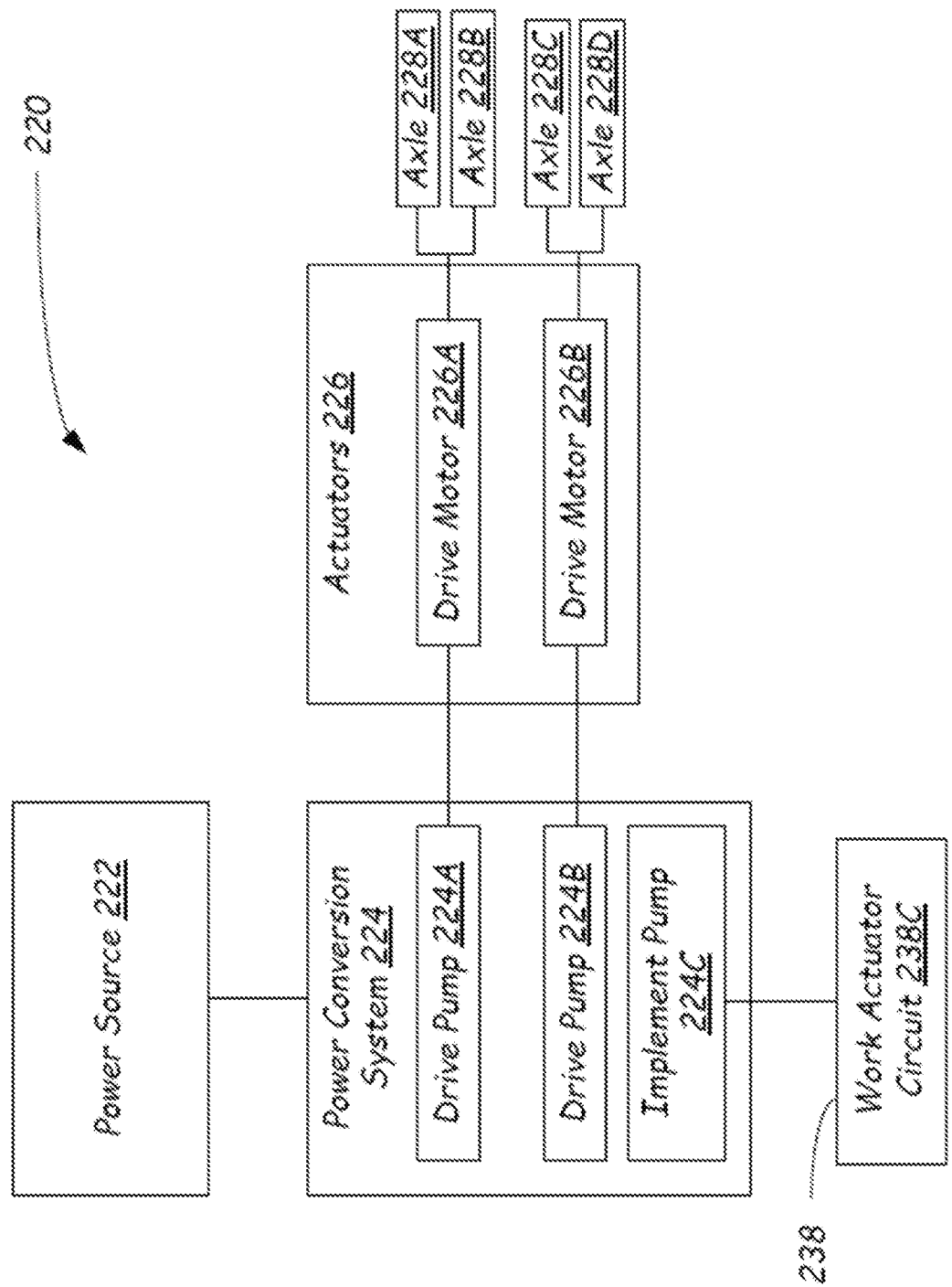
FIG. 4 is a block diagram illustrating components of a power system of a loader such as the loader illustrated in FIGS. 2-3.

Frame 210 supports and generally encloses the power system 220 so that the various components of the power system 220 are not visible in FIGS. 2-3. FIG. 4 includes, among other things, a diagram of various components of the power system 220. Power system 220 includes one or more power sources 222 that can generate and/or storing power for use on various machine functions. On power machine 200, the power system 220 includes an internal combustion engine. Other power machines can include electric generators, rechargeable batteries, various other power sources or any combination of power sources that can provide power for given power machine components. The power system 220 also includes a power conversion system 224, which is operably coupled to the power source 222. Power conversion system 224 is, in turn, coupled to one or more actuators 226, which can perform a function on the power machine.

Power conversion systems in various power machines can include various components, including mechanical transmissions, hydraulic systems, and the like. The power conversion system 224 of power machine 200 includes a pair of hydrostatic drive pumps 224A and 224B, which are selectively controllable to provide a power signal to drive motors 226A and 226B. The drive motors 226A and 226B in turn are each operably coupled to axles, with drive motor 226A being coupled to axles 228A and 228B and drive motor 226B being coupled to axles 228C and 228D. The axles 228A-D are in turn coupled to tractive elements 219A-D, respectively. The drive pumps 224A and 224B can be mechanically, hydraulic, and/or electrically coupled to operator input devices to receive actuation signals for controlling the drive pumps. In exemplary embodiments, the power source 222 includes an internal combustion engine (such as engine 322 shown in FIG. 5) and the power conversion system 224 includes an in-line pump package (such as pump package 324 shown in FIG. 5). Natural frequency altering features of such an engine/pump package combination are shown and discussed below with reference to FIG. 5.

The arrangement of drive pumps, motors, and axles in power machine 200 is but one example of an arrangement of these components. As discussed above, power machine 200 is a skid-steer loader and thus tractive elements on each side of the power machine are controlled together via the output of a single hydraulic pump, either through a single drive motor as in power machine 200 or with individual drive motors. Various other configurations and combinations of hydraulic drive pumps and motors can be employed as may be advantageous.

The power conversion system 224 of power machine 200 also includes a hydraulic implement pump 224C, which is also operably coupled to the power source 222. The hydraulic implement pump 224C is operably coupled to work actuator circuit 238C. Work actuator circuit 238 includes lift cylinders 238 and tilt cylinders 235 as well as control logic (such as one or more valves) to control actuation thereof. The control logic selectively allows, in response to operator inputs, for actuation of the lift cylinders and/or tilt cylinders. In some machines, the work actuator circuit also includes control logic to selectively provide a pressurized hydraulic fluid to an attached implement.

The description of power machine 100 and loader 200 above is provided for illustrative purposes, to provide illustrative environments on which the embodiments discussed below can be practiced. While the embodiments discussed can be practiced on a power machine such as is generally described by the power machine 100 shown in the block diagram of FIG. 1 and more particularly on a loader such as track loader 200, unless otherwise noted or recited, the concepts discussed below are not intended to be limited in their application to the environments specifically described above.

Figure 5:
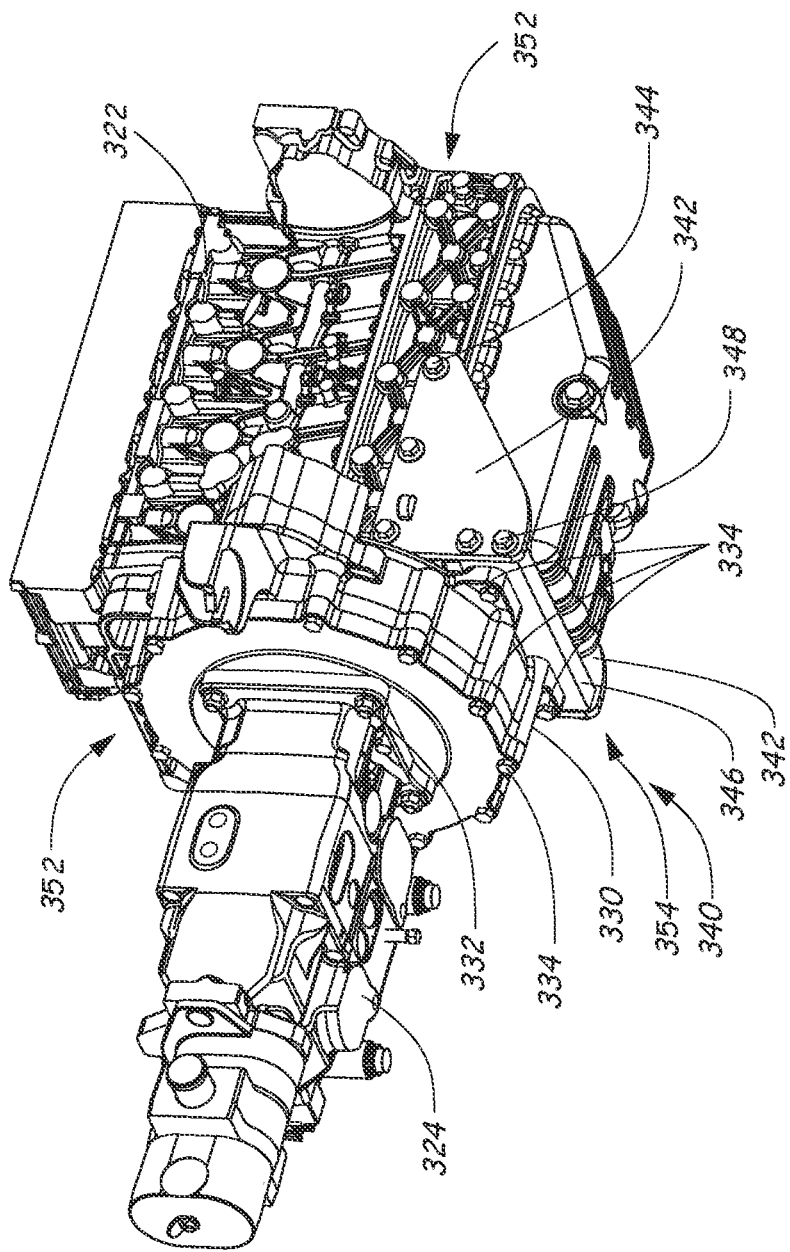
FIG. 5 is a perspective view illustration of an internal combustion engine connected in-line with a hydrostatic or hydraulic pump package and utilizing a stiffening bracket to change the natural frequency of the engine-pump package combination.

Referring now to FIG. 5, shown is an exemplary embodiment of a power source 322, in the form of an internal combustion engine, with a power conversion system 324 mounted in-line with engine 322. While, as discussed above, the power conversion system in various embodiments can include elements other than a hydraulic pump, shown in FIG. 5 is a hydraulic pump. For simplicity's sake the rest of the discussion of FIG. 5 will refer the power conversion system specifically as a hydraulic pump, however. In the illustrated embodiment, pump package 324 is bolted, using bolts or fasteners 332, to a flywheel housing 330 coupled to the engine 322. As discussed above, when an internal combustion engine is connected in-line with a hydrostatic/hydraulic pump package, the excitation frequency from the combustion firing of the engine often matches the natural frequency of the engine/pump system. In addition, other vibration sources from the engine (such as a cam shaft, crank shaft, reciprocating motion of the pistons in the engine, etc.) can match the natural frequency of the engine/power conversion system. If any vibration source matches the natural frequency of the engine/power conversion system, the engine/power conversion system will be excited and will go into resonance. When the engine/power conversion system goes into resonance, the resulting vibration can be transferred to an operator, causing discomfort and/or fatigue to the operator. Ultimately, such vibration can also damage or destroy the engine/power conversion system.

To avoid damage to the engine and pump package, disclosed embodiments utilize a configuration in which the pump package 324 is bolted to the flywheel housing 330 of a flywheel and a stiffening bracket 340 is secured to both the flywheel housing 330 to the engine 322 to provide more structural stiffness to the engine/pump system to physically change its natural frequency. The stiffening bracket 340 increases the natural frequency of the engine/pump system to a frequency far enough above the engine firing frequency to prevent resonance.

In the exemplary design shown in FIG. 5, stiffening bracket 340 includes two vertical support members or plates 342 bolted to the bottom portions of first and second sides 352 of the engine using fasteners 344. The bracket 340 also includes a cross member 346 bolted using fasteners 348 or otherwise attached between the two vertical support plates 342. The cross-member 346 is positioned along a side 354 of the engine extending between the opposing sides 352. The flywheel housing 330 is thus bolted to bracket 340 using fasteners 334, and the bracket 340 is bolted to the engine 322 as described, coupling the pump package 324 to the engine 322. This will change the natural frequency of the engine/pump package. While bracket 340 is shown as a three-piece assembly in one example embodiment, the bracket 340 can instead be formed from fewer (e.g., one or two) or additional pieces. The pieces can be castings or other pieces of metal. In some embodiments, portions of the bracket 340 can be integrated into the flywheel housing and/or engine. In general, bracket 340 can be any configuration which increases the natural frequency of the engine/pump system to a frequency sufficiently far from the engine firing frequency to prevent resonance.

Although the present invention has been described with reference to preferred embodiments, workers skilled in the art will recognize that changes may be made in form and detail without departing from the scope of the discussion.

What is claimed is:
1. A power machine, comprising:
a frame;
a power system supported by the frame, the power system including:
  a power source including an engine and a flywheel housing mounted to the engine with a flywheel positioned within the flywheel housing and driven by an output of the engine;
  a power conversion system including a hydraulic pump package that is mounted to the flywheel housing and is arranged in-line with and operatively coupled to the engine and a drive motor in hydraulic communication with the hydraulic pump package; and
  a stiffening bracket fastened to the flywheel housing and to the engine, but not to the frame, and config- ured to alter a natural frequency of the combined engine and hydraulic pump; and a traction system having a tractive element operatively coupled to the drive motor and configured to be driven by the drive motor to control movement of the power machine.

2. The power machine of claim 1, wherein the engine is an internal combustion engine, and wherein the stiffening bracket is configured to alter the natural frequency of the combined engine and hydraulic pump package system relative to a firing frequency of the internal combustion engine.

3. The power machine of claim 2, wherein the stiffening bracket is configured to increase the natural frequency of the combined engine and in-line pump package system.

4. The power machine of claim 3, wherein the hydraulic pump package is bolted to the flywheel housing with fasteners.

5. The power machine of claim 3, wherein the stiffening bracket includes first and second vertical support plates each secured to one of first and second opposing sides of the engine.

6. The power machine of claim 5, wherein the first and second vertical support plates are each secured to bottom portions of the ones of the first and second opposing sides of the engine.

7. The power machine of claim 6, wherein the stiffening bracket further includes a cross-member secured to each of the first and second vertical support plates, and wherein the flywheel housing is mounted to the engine through the cross-member.

8. The power machine of claim 7, wherein the cross-member is positioned along a side of the engine extending between the first and second opposing sides.

9. A power machine, comprising:
a frame;
a power source, supported by the frame, including an engine and a flywheel;
a power conversion system including a hydraulic pump package mounted to a flywheel housing of the flywheel and coupled in-line with the engine;
a bracket mounted to the flywheel housing and to the engine, but not to the frame, and configured to alter a natural frequency of a combined engine and hydraulic pump package system relative to a frequency of the engine.

10. The power machine of claim 9, wherein the engine is an internal combustion engine, and wherein the bracket is configured to mount the flywheel housing to the engine.

11. The power machine of claim 10, wherein the bracket is a stiffening bracket configured to alter the natural frequency of the combined engine and in-line hydraulic pump package system relative to a firing frequency of the internal combustion engine.

12. The power machine of claim 11, wherein the bracket is configured to increase the natural frequency of the combined engine and in-line hydraulic pump package system.

13. The power machine of claim 12, wherein the in-line hydraulic pump package is bolted to the flywheel housing with first fasteners.

14. The power machine of claim 13, wherein the flywheel housing is bolted to the engine using second fasteners.

15. The power machine of claim 14, wherein the bracket includes first and second vertical support plates each secured to one of first and second opposing sides of the engine.

16. The power machine of claim 15, wherein the first and second vertical support plates are each secured to bottom portions of the ones of the first and second opposing sides of the engine.

17. The power machine of claim 15, wherein the bracket further includes a cross-member secured to each of the first and second vertical support plates, and wherein the flywheel housing is mounted to the engine through the cross-member.

18. The power machine of claim 17, wherein the cross-member extends along a side of the engine extending between the first and second opposing sides, and wherein the second fasteners extend through the cross-member.

19. A power machine, comprising:
a frame;
a power system supported by the frame, the power system including:
a power source including an engine and a flywheel housing mounted to the engine with a flywheel positioned within the flywheel housing and driven by an output of the engine;
a power conversion system including a hydraulic pump package that is mounted to the flywheel housing and is arranged in-line with and operatively coupled to the engine and a drive motor in hydraulic communication with the hydraulic pump package; and
a stiffening bracket fastened to the flywheel housing and to the engine and configured to alter a natural frequency of the combined engine and hydraulic pump, wherein the stiffening bracket includes first and second vertical support plates each secured to one of first and second opposing sides of the engine, and a cross-member secured to each of the first and second vertical support plates, and wherein the flywheel housing is mounted to the engine through the cross-member; and
a traction system having a tractive element operatively coupled to the drive motor and configured to be driven by the drive motor to control movement of the power machine.

20. The power machine of claim 19, wherein the cross-member is positioned along a side of the engine extending between the first and second opposing sides.

21. A power system for a power machine, the power system comprising:
a power source including an engine and a flywheel;
a power conversion system including a hydraulic pump package mounted to a flywheel housing of the flywheel and coupled in-line with the engine;
a bracket mounted to the flywheel housing to the engine and configured to alter a natural frequency of a combined engine and hydraulic pump package system relative to a frequency of the engine, wherein the bracket includes first and second vertical support plates each secured to one of first and second opposing sides of the engine and a cross-member secured to each of the first and second vertical support plates, and wherein the flywheel housing is mounted to the engine through the cross-member.

* * * * *